US009190025B1

United States Patent
Zehner et al.

(10) Patent No.: US 9,190,025 B1
(45) Date of Patent: Nov. 17, 2015

(54) ADAPTING DISPLAY FONTS FOR REFLECTIVE DISPLAYS

(71) Applicant: Amazon Technologies, Inc., Reno, NV (US)

(72) Inventors: Robert Waverly Zehner, Los Gatos, CA (US); Nadim Awad, San Francisco, CA (US); Scott Michael Dylewski, San Francisco, CA (US); Ronald Joseph Fernandez, Palo Alto, CA (US); Herve Jacques Clement Letourneur, San Francisco, CA (US); Jonathan Ian McCormack, Los Altos, CA (US); Hannah Rebecca Lewbel, Campbell, CA (US)

(73) Assignee: Amazon Technologies, Inc., Reno, NV (US)

( * ) Notice: Subject to any disclaimer, the term of this patent is extended or adjusted under 35 U.S.C. 154(b) by 203 days.

(21) Appl. No.: 13/830,677

(22) Filed: Mar. 14, 2013

(51) Int. Cl.
  *G09G 5/00* (2006.01)
  *G09G 5/22* (2006.01)
  *G06T 11/00* (2006.01)
  *G06K 15/02* (2006.01)
  *G06F 17/00* (2006.01)

(52) U.S. Cl.
  CPC ......................................... *G09G 5/22* (2013.01)

(58) Field of Classification Search
  USPC ......... 345/581, 636, 639, 643, 467, 471, 551, 345/1.1, 1.3, 5; 358/1.11, 462; 715/200, 715/256, 269, 270, 273
  See application file for complete search history.

(56) References Cited

U.S. PATENT DOCUMENTS

| | | | |
|---|---|---|---|
| 5,557,722 A * | 9/1996 | DeRose et al. | 715/234 |
| 5,781,714 A * | 7/1998 | Collins et al. | 345/471 |
| 7,222,306 B2 * | 5/2007 | Kaasila et al. | 715/801 |
| 8,018,431 B1 * | 9/2011 | Zehr et al. | 345/156 |
| 8,413,904 B1 * | 4/2013 | Zehr et al. | 235/492 |
| 8,692,763 B1 * | 4/2014 | Kim | 345/156 |
| 8,803,794 B1 | 8/2014 | Froment et al. | |
| 8,866,698 B2 * | 10/2014 | Ortega et al. | 345/1.1 |
| 8,878,899 B2 * | 11/2014 | Suh et al. | 348/43 |
| 8,898,566 B1 * | 11/2014 | Rachabathuni | 715/708 |
| 2001/0021937 A1 * | 9/2001 | Cicchitelli et al. | 707/517 |
| 2005/0001856 A1 | 1/2005 | Sparre et al. | |
| 2008/0309612 A1 | 12/2008 | Gormish et al. | |
| 2011/0219294 A1 * | 9/2011 | Leshner et al. | 715/234 |
| 2013/0174017 A1 * | 7/2013 | Richardson et al. | 715/234 |
| 2014/0157120 A1 * | 6/2014 | Le Chevalier et al. | 715/273 |

* cited by examiner

OTHER PUBLICATIONS

Office Action for U.S. Appl. No. 13/717,604, mailed on Jan. 16, 2015, Nadm Awad, "Reducing Ghosting and Blooming Effects on Displays", 34 pages.

*Primary Examiner* — Wesner Sajous
(74) *Attorney, Agent, or Firm* — Lee & Hayes, PLLC

(57) ABSTRACT

Techniques for utilizing different versions of a same font when rendering subsequent portions of a content item. For instance, envision that a user requests to open an electronic book. In response to this request, a display controller may display the first page of the electronic book using a flashing update and, therefore, may display the text using a regular weight of a particular font. However, when the user subsequently requests to turn to the second page of the electronic book, the display controller (utilizing a non-flashing update) may update the display using a version of the same font having a lesser weight. Given that some level of bleeding with likely occur when using the non-flashing update, the lesser weight coupled with the bleeding may result in text that approximates the weight of the text of the first page of the electronic book.

21 Claims, 5 Drawing Sheets

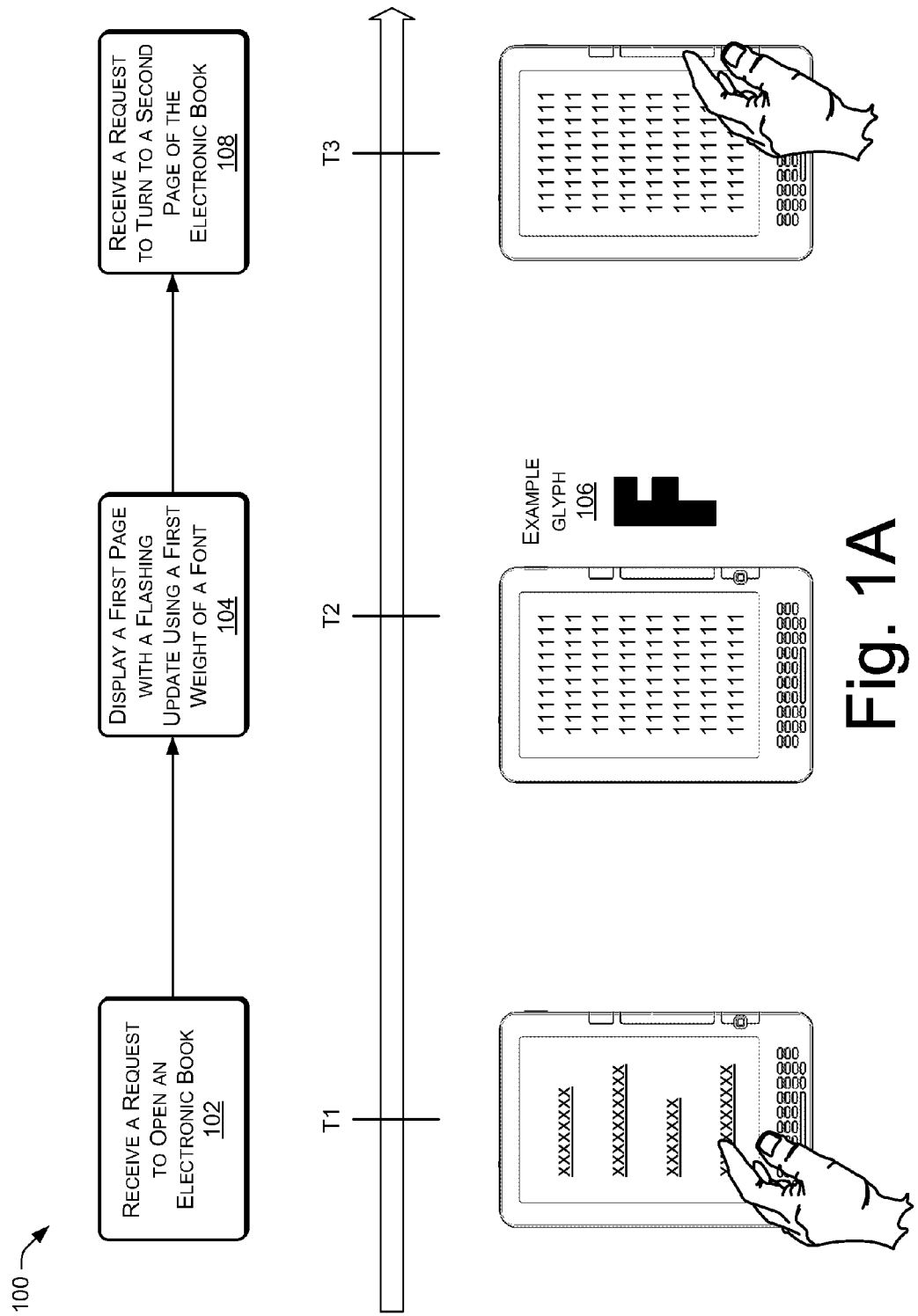

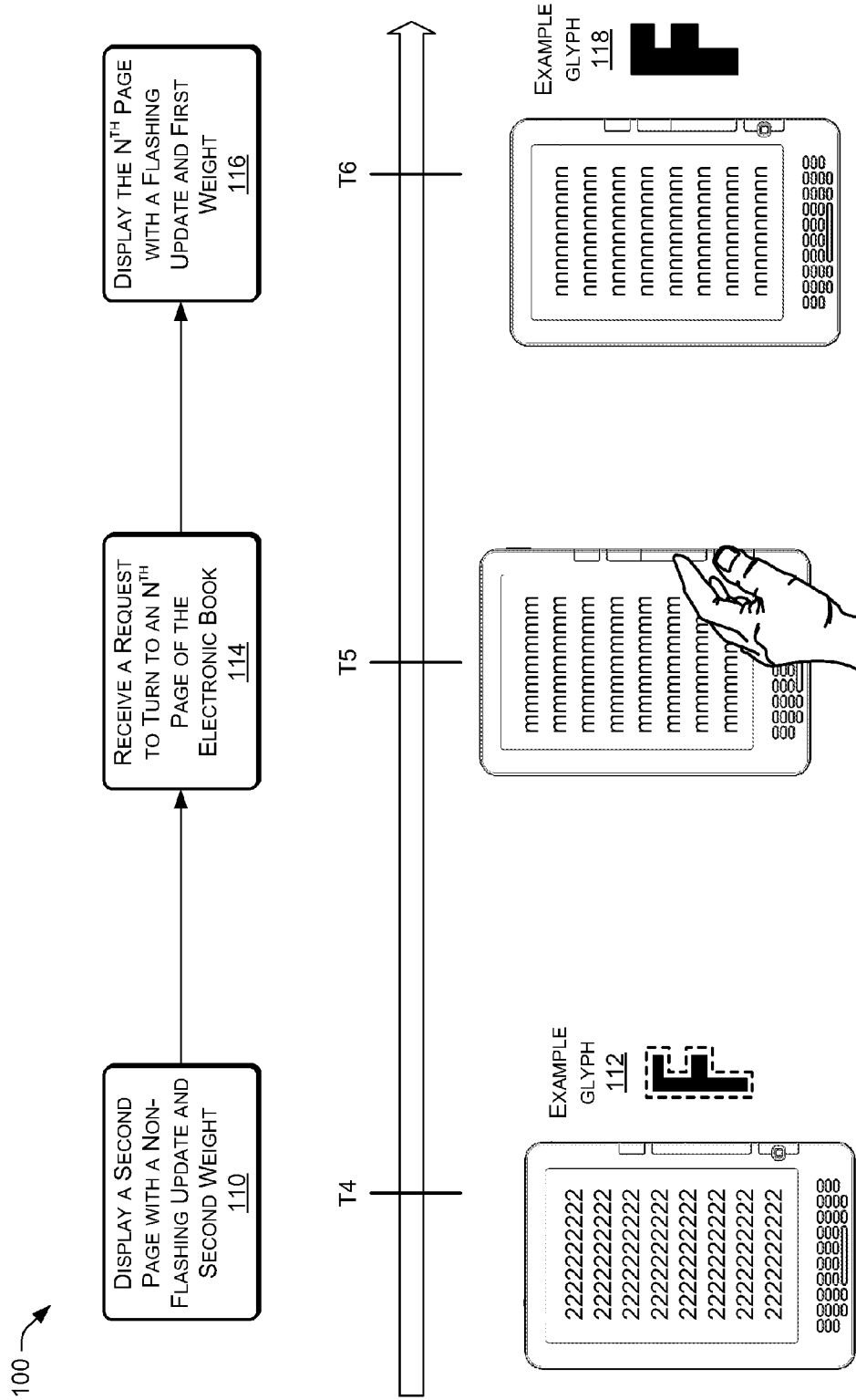

ADAPTING DISPLAY FONTS FOR REFLECTIVE DISPLAYS

BACKGROUND

A large and growing population of users is enjoying entertainment through the consumption of digital content, such as music, movies, images, electronic books, and so on. The users employ various electronic devices to consume such content. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 1A-1B illustrate an example flow diagram of an electronic device performing a flashing update on its display using a font in a first weight and, thereafter, performing a non-flashing partial update on the display using the font in a second, lesser weight. In some instances, effects of the non-flashing partial update cause the text resulting from this update to resemble, in size, the text that results from the flashing update.

DETAILED DESCRIPTION

Figure 2:
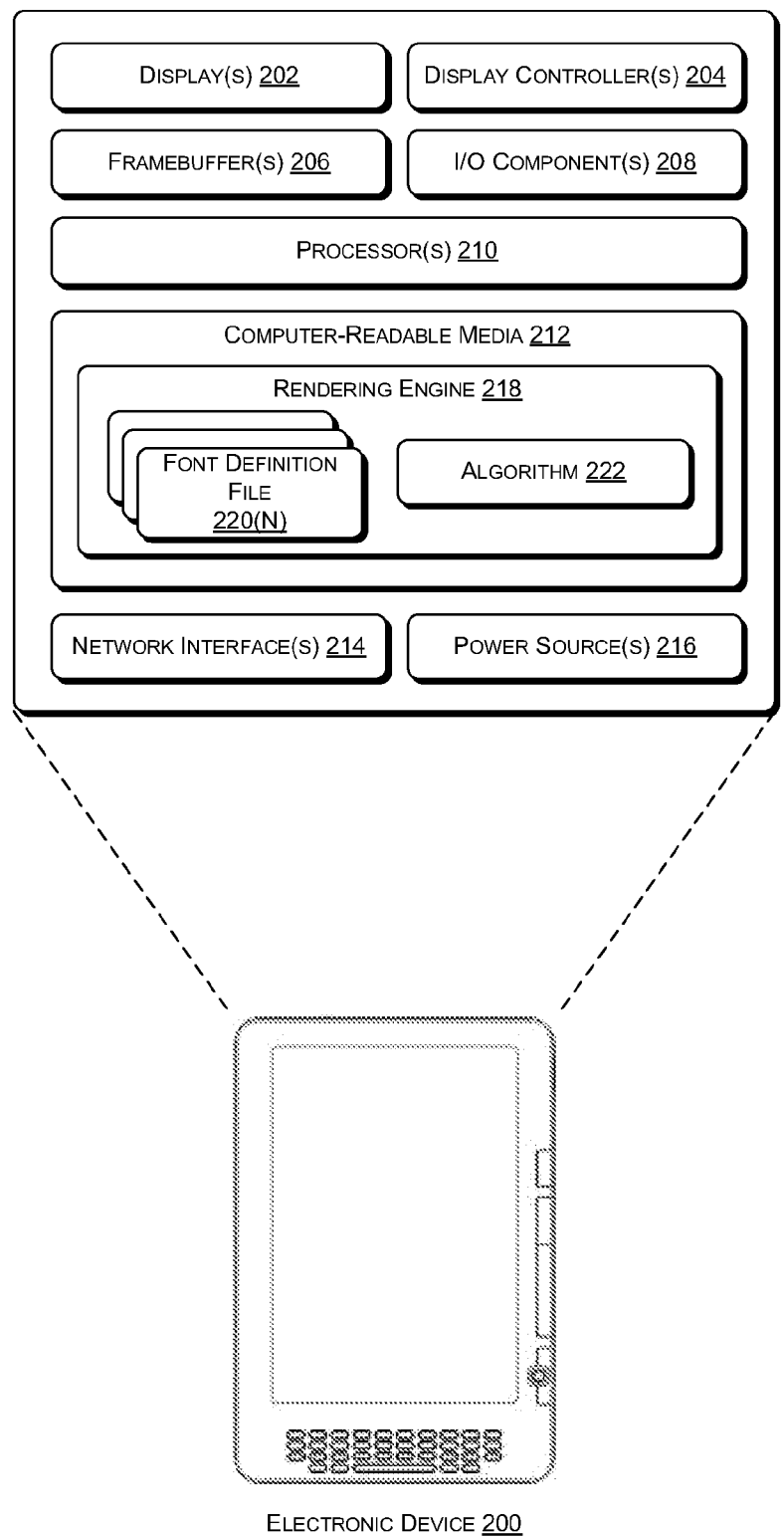
FIG. 2 illustrates an example electronic device that includes an electronic paper display and functionality for adapting fonts based on a type of update used to display content on the display.

Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display.

In one implementation, an electronic paper display comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the electronic paper display comprises an electrophoretic display that includes oppositely charged light and dark particles. In order to create white, a display controller moves the light particles to the front side of the display by creating a corresponding charge at an electrode near the front and moves the dark particles to the back of the display by creating a corresponding charge at an electrode near the back. In order to create black, meanwhile, the controller changes the polarities and moves the dark particles to the front and the light particles to the back. Furthermore, to create varying shades of gray, the controller may utilize different arrays of both light and dark particles.

In either instance, the display controller may update an electronic paper display (i.e., may move the ink particles to the desired positions) using different update types or waveforms. One type of update, known as a flashing update or waveform, updates an entirety of the display and causes each pixel to be rendered as either black or white before being rendered according to a value specified by the content item being displayed. For instance, if a pixel has an initial value corresponding to white but has a value corresponding to gray according to the subsequent content that is to be displayed, then the display controller may initially render this pixel black before rendering it in the specified gray. This use of flashing updates helps alleviate ghosting effects from previously rendered content. That is, by updating the entire display and moving each ink particle to black or white and then to a desired position essentially erases the image previously displayed on the display. While a flashing update largely eliminates these ghosting effects, this type of update may be visually disruptive to the user operating the device (e.g., reading an electronic book).

In other instances, the display controller may utilize a non-flashing update or waveform that updates less than an entirety of the display. For instance, a non-flashing update may result in updating pixels of the display having values that have changed since the last update, but refraining from updating pixels having values that have not changed. For instance, if a particular pixel has a value of white in both a first page and a second page of an electronic book, then the display controller would not update this pixel in response to a user navigating from the first page to the second page. In the flashing update example, meanwhile, the controller would have "flashed" this pixel to black and then back to white in response to the user navigating from the first to the second page. While non-flashing updates are less disruptive to a user's experience as compared to flashing updates, the use of non-flashing updates may result in ghosting effects on the display, particularly in instances where the controller utilizes a number of sequential non-flashing updates. That is, if the display controller utilizes too many non-flashing updates in a row, the cumulative ghosting effects may detrimentally affect the user's experience given the lingering appearance of previously display pages on the display.

To balance the desire to avoid ghosting effects with the desire to avoid the somewhat disruptive nature of flashing updates as much as possible, the display controller may be configured to use a flashing update to render a first portion of a content item, a non-flashing update to render a number of subsequent portions, and then repeating this pattern. For instance, when a user requests to open an electronic book on an electronic device having an electronic paper display, the display controller may initially perform a flashing update so that the first page of the book has a very clean appearance (i.e., has no ghosting effects from the previously display content). When the user requests to navigate to the second page, meanwhile, the display controller may utilize a non-flashing update. The display controller may continue to use non-flashing updates until some number of "n" page turns. For instance, when the user requests to navigate to the fifth page of the electronic book, the display controller may "flash" the screen (i.e., may use a flashing update) to clear any ghosting affects that the display may have accumulated through use of the non-flashing updates.

However, given that the display controller updated the display three times using a non-flashing update (for the second, third, and fourth pages), some level of ghosting may have occurred. In one particular example, pixels having darker values (e.g., dark gray or black) tend to "bleed" onto neighboring pixels that are not updated, resulting in a pixel that appears to the user to be larger than it should. Therefore, when the entire display is updated using a non-flashing update, the characters of the text appear darker, heavier, bolder, or more distinct to the user than if the page were updated using a flashing waveform.

To account for this effect while still avoiding the need to flash the display with each page turn, the following disclosure describes techniques to utilize different versions of a same font when rendering subsequent portions of a content item. For instance, envision that a user requests to open an electronic book. In response to this request, the display controller may display the first page of the electronic book using a flashing update and, therefore, may display the text using a regular weight of a particular font (i.e., may use an unadjusted version of whatever font the book or the user specifies). However, when the user subsequently requests to turn to the second page of the electronic book, the display controller (utilizing a non-flashing update) may update the display using a version of the same font having a lesser weight. Given that some level of bleeding with likely occur when using the non-flashing update, the lesser weight coupled with the bleeding may result in text that approximates the weight of the text of the first page of the electronic book. The "weight" of a font may refer to a size of any portion of the font, such as a thickness of the font (e.g., a thickness of the character outlines of the font relative to the height of the characters).

In addition, the display controller may continue to use this lesser-weighted font until the user requests to turn to an $n^{th}$ page (e.g., the $5^{th}$ page), at which point the display controller may perform a flashing update to clear the display and, hence, may use the unadjusted version of the font. In some instances, the weight of the font utilized by the display controller continues to become less and less between non-flashing updates, given that the bleeding affects from the non-flashing updates may be cumulative. For instance, after flashing the display to display the first page, the display controller may utilize a version of the font having a lesser weight to display the second page, a version of the font having an even lesser weight to display the third page, and so forth until returning to using the regular version of the font upon displaying the $n^{th}$ page (which is displayed using a flashing update).

In another example, the techniques may utilize dot-gain compensation techniques by using a first, default version of a font when performing a flashing update and a second, differently shaped version of the font when performing a non-flashing update (e.g., an outline of the glyphs of the different versions may differ). In some instances, a font may bleed in a non-uniform manner. As such, the second version of the font may be shaped to anticipate this bleeding. To determine a shape for each glyph, a glyph may be rendered using a non-flashing update and the resulting glyph rendered on the display may be analyzed. The second version of font for that particular glyph may then be shaped to anticipate the identified bleeding. Of course, data may be iteratively collected in order to determine a suitable shape for each glyph in the second version of the font.

By utilizing periodic rather than continuous flashing updates, the user receives the benefits of the non-flashing updates, which are less disruptive to the user experience. In addition, by lessening the font size or altering a shape of each glyph of the font during these non-flashing updates, the text in each page of content rendered to the user appears to be approximately equal in weight given the bleeding affects of the non-flashing updates. The techniques may therefore, in some instances, balance the desire to avoid as many flashing updates as possible while maintaining uniformity in the resulting display of the electronic book.

In addition, in some instances the amount of bleeding may depend upon a color value that a particular pixel is going to be rendered as. As such, the different versions of the font may take into account the color values of the pixels, such that the weight or shape of glyphs of a particular version of a particular font differ based on the colors to be rendered (e.g., light gray, dark gray, black, etc.). In addition, the techniques may receive feedback from users regarding the consistency of text between the flashing and non-flashing updates, such that the version of the font may be tuned to account for this feedback. Furthermore, while the examples below describe rendering different versions of text in order to account for and anticipate blooming effects, these techniques apply equally other types of images.

In some instances, the display controller may additionally or alternatively select a weight or shape of a font to use based on one or more other criteria. As background, different factors may contribute to the amount of bleeding that occurs during non-flashing updates. For instance, a display may tend to have a higher degree of bleed in hotter temperatures. As such, a device may utilize a temperature sensor or other means to determine an ambient temperature of the device and may utilize this temperature in determining a size of a weight to use. Additionally, the amount of bleeding may vary among different "batches" of electronic paper displays. For instance, a first "batch" or "lot" of electronic paper displays may be tested at a certain temperature to determine how much these displays bleed. A second batch or lot may also be tested at the same temperature to determine a bleed of these displays. Thereafter, a particular device may be tuned to account for the amount of bleed found in the particular batch that the device is associated with.

The techniques described herein may be implemented in a variety of ways and by a variety of electronic devices. In addition, it is noted that because electronic books are structured as virtual frames presented on a computing device, the term "page" as used herein refers to a collection of content presented at one time on a display. Thus, "pages" as described herein are not fixed permanently, and may be redefined or repaginated based on variances in display conditions, such as screen size, font type or size, margins, line spacing, resolution, or the like.

Furthermore, the term "electronic book" or "content item" as used herein, may include any type of content which can be stored and distributed in digital form. By way of illustration, and without limitation, electronic books and content items can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, etc.

FIGS. 1A-1B illustrates an example flow diagram 100 of an electronic device performing a flashing update on its display using a font in a first weight and, thereafter, performing a non-flashing partial update on the display using the font in a second, lesser weight. In some instances, effects of the non-flashing partial update cause the text resulting from this update to resemble, in size, the text that results from the flashing update.

At 102, the electronic device receives a request to open an electronic book. For instance, a user may utilize a touch screen, a keypad or other type of input mechanism to request that the device display an electronic book on the display of the device. At 104, the electronic device displays a first page of the electronic book in accordance with the user's request. In this example, the device utilizes a flashing update and, therefore, displays text of the first page in a first weight of a particular font. The first weight may be the "regular" weight of the font as selected by the user (e.g., explicitly selected, selected based on the user's preferences, etc.). An example glyph 106 illustrates an example size that the device may use when updating the display using a flashing update, and this example glyph 106 is to be subsequently contrasted with an example glyph used for a non-flashing update.

At 108, the electronic device receives a request from the user to turn to a second page of the electronic book, which need not, but may, be a subsequent page in the book. As FIG. 1B illustrates, at 110 the device displays the second page on the display using a non-flashing update. In addition, because the device uses the non-flashing update, the device uses a second font weight that is less than the first font weight used for the displaying of the first page, as illustrated by an example glyph 112. For comparative purposes, an outline of the example glyph 106 is shown around the example glyph 112.

While not illustrated, the electronic device may continue to utilize non-flashing updates as the user requests that the device display subsequent pages of the electronic book. When updating the display in this manner, the device may utilize the second font weight or may continue to lessen the font weight with each page turn, with each certain number of page turns, or the like. At 114, the device receives a request from the user to turn to an $n^{th}$ page of the electronic book. In response, at 116 the device displays the $n^{th}$ page using a flashing update and using the initial, first weight of the font, as shown by an example glyph 118. By using the flashing update, the device effectively clears the display from any ghosting affects that have accumulated during the previous page turns. Furthermore, by using the "regular" font weight in combination with the clearing of any ghosting or bleeding, the text of the $n^{th}$ page appears to resemble, in size, the size of the text on the subsequent pages.

FIG. 2 illustrates an example electronic device 200 configured to utilize different versions of a font based on one or more criteria, such as a type of update being used, an ambient temperature of the device 200, which batch of multiple different batches of displays the device 200 is associated with and so forth. While FIG. 2 illustrates the device 200 as a dedicated electronic book reading device, in other implementations the device 200 may comprise any other type of mobile electronic device (e.g., a laptop computer, a tablet computing device, a multifunction communication device, a portable digital assistant (PDA), etc.) or non-mobile electronic device (e.g., a desktop computer, a television, etc.). In addition, while FIG. 2 illustrates several example components of the electronic device 200, it is to be appreciated that the device 200 may also include other conventional components, such as an operating system, system busses, input/output components, and the like.

Regardless of the specific implementation of the electronic device 200, this device 200 includes one or more displays 202 and corresponding display controllers 204. The device 200 may also include one or more framebuffers 206 from which the display controller(s) 204 updates the display(s) 202. The one or more displays 202 may represent electronic paper displays, reflective liquid crystal displays (LCDs), electrochromic displays (ECDs), and/or any other type of reflective display. Electronic paper displays may include electrophoretic displays, gyricon displays, electrowetting displays, electrofluidic displays, interferometric modulator displays, cholestric liquid crystal displays and the like.

In addition to including the one or more displays 202 and corresponding functionality, FIG. 2 illustrates that the device 200 includes one or input/output (I/O) components 208 for operating the device 200, such as a touch sensor, a keypad, a joystick or the like. FIG. 2 further illustrates that the electronic device includes one or more processors 210 and computer-readable media 212, as well as one or more network interfaces 214 and one or more power sources 216 that provide power to the device 200. The network interfaces 214 may support both wired and wireless connection to various networks, such as cellular networks, radio, WiFi networks, short range networks (e.g., Bluetooth), IR, and so forth.

Depending on the configuration of the electronic device 200, the computer-readable media 212 (and other computer-readable media described throughout) is an example of computer storage media and may include volatile and nonvolatile memory. Thus, the computer-readable media 212 may include, but is not limited to, RAM, ROM, EEPROM, flash memory, or other memory technology, or any other medium which can be used to store media items or applications and data which can be accessed by the electronic device 200.

The computer-readable media 212 may be used to store any number of functional components that are executable on the processors 210, as well as data and content items that are rendered by the electronic device 200. Thus, the computer-readable media 212 may include an operating system and a storage database to store one or more content items, including electronic books, audio books, songs, videos, still images, and the like. The computer-readable media 212 of the electronic device 200 may also store one or more content presentation applications to render content items on the device 200. These content presentation applications may be implemented as various applications depending upon the content items. For instance, the application may be an electronic book reader application for rending textual electronic books, an audio player for playing audio books or songs, a video player for playing video, and so forth.

As illustrated, in this example the computer-readable media 212 includes or has access to a rendering engine 218 that determines how to render content on the display 202 and provides corresponding instructions to the display controller 204. For instance, if a user requests to open an electronic book, the reading application on the device 200 will request that some content be initially displayed on the display 202. As such, the rendering engine 218 will instruct the display controller 204 to display the specified content. The display controller 204 then fills the framebuffer 206 with the requisite pixel values before the pixels of the display 202 are updated to reflect these values.

As illustrated, the rendering engine 218 includes or has access to one or more font definition files 220(1), ..., 220(N). In some instances, the font definition files 220(1)-(N) comprise files that specify a same font in different weights. As such, the rendering engine 218 may utilize a first of the font definition files when rendering a page of an electronic book using a flashing update and another of the font definition files when rendering a page using a non-flashing update. For instance, the rendering engine 218 may utilize a font definition file specifying a default or selected weight when rendering the page using the flashing update and, due to the pixel bleeding described above, may utilize a font definition file specifying a lighter weight of the same font when rendering the page using the non-flashing update.

In some instances, the rendering engine 218 utilizes two font definition files—one for use when flashing the screen and another for use when performing a non-flashing update. In other instances, the engine 218 utilizes more than two font definition files, with the weight of each font file used decreasing with the number of non-flashing updates since the last flashing update. By using a lesser and lesser weighted font, the size of the resulting display texted appears visually similarly given the cumulative bleeding effects caused by the non-flashing updates.

In addition or the in the alternative, FIG. 2 illustrates that the rendering engine also stores or has access to an algorithm 222, which the engine 218 may utilize when determining a weight of a font to use when rendering a page. That is, rather than utilizing a font definition file that already specifies a particular weight of a font, the rendering engine 218 may calculate a weight of the font on-the-fly (i.e., in real-time) using the algorithm 222. To calculate the weight in this manner, the rendering engine 218 may reference one or more criteria. These criteria may include an initial size of a font selected by a user of the device 200, whether a subsequent update is a flashing or non-flashing update, a number of non-flashing updates since the last flashing update, an ambient temperature of the device 200, a batch associated with the display 202 and/or the like.

In some instances, the electronic device 200 may have features or functionality in addition to those that FIG. 2 illustrates. For example, the device 200 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 200 may reside remotely from the device 200 in some implementations. In these implementations, the device 200 may utilize the network interfaces 214 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 3:
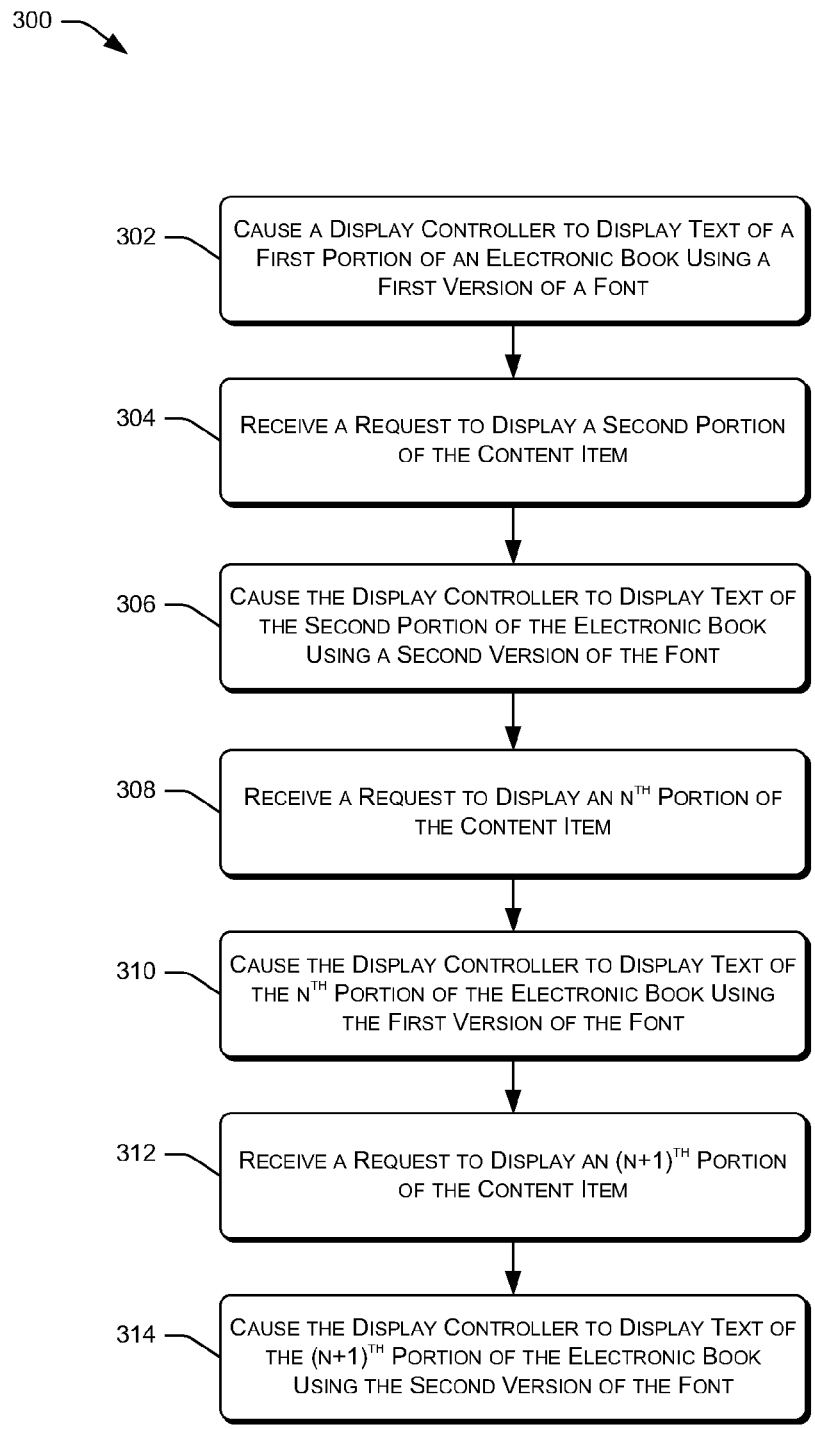
FIG. 3 illustrates an example process for displaying text of a first portion of a content item using a first version of a particular font and, thereafter, displaying text of a second portion of the content item using a second version of the particular font.

FIG. 3 illustrates an example process 300 for rendering text of a first portion of a content item using a first version of a particular font and, thereafter, rendering text of a second portion of the content item using a second version of the particular font. Each process described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The process 300 includes, at 302, causing a display controller to display text of a first portion of an electronic book using a first version of font. In some instances, the display controller uses a flashing update or waveform to display the first portion and, as such, uses a default size of the font when displaying the text. At 304, the process 300 receives a request to display a second portion of the content item. For instance, a user may request to turn from a first page in an electronic book to a second page.

In response, at 306 the process 300 causes the display controller to display the second portion of the content item using a second version of the font. In some instances, the display controller may use a non-flashing update or waveform to display the second portion and, as such, may use a weight of the font that is less than a weight of the first version of the text. Sometime thereafter, at 308 the process 300 may receive a request to display an $n^{th}$ portion of the content item, with n being greater than 2. At 310, the process 300 may cause the display controller to display the $n^{th}$ portion of the content item using the first version of the font (e.g., because the display controller is flashing the display). At 312, meanwhile, the process 300 may receive a request to display a $(n+1)^{th}$ portion of the content item and, at 314, may cause the display controller to display this portion of the content item using the second version of the font (e.g., the font in the lesser weight because the controller is performing a non-flashing update).

Figure 4:
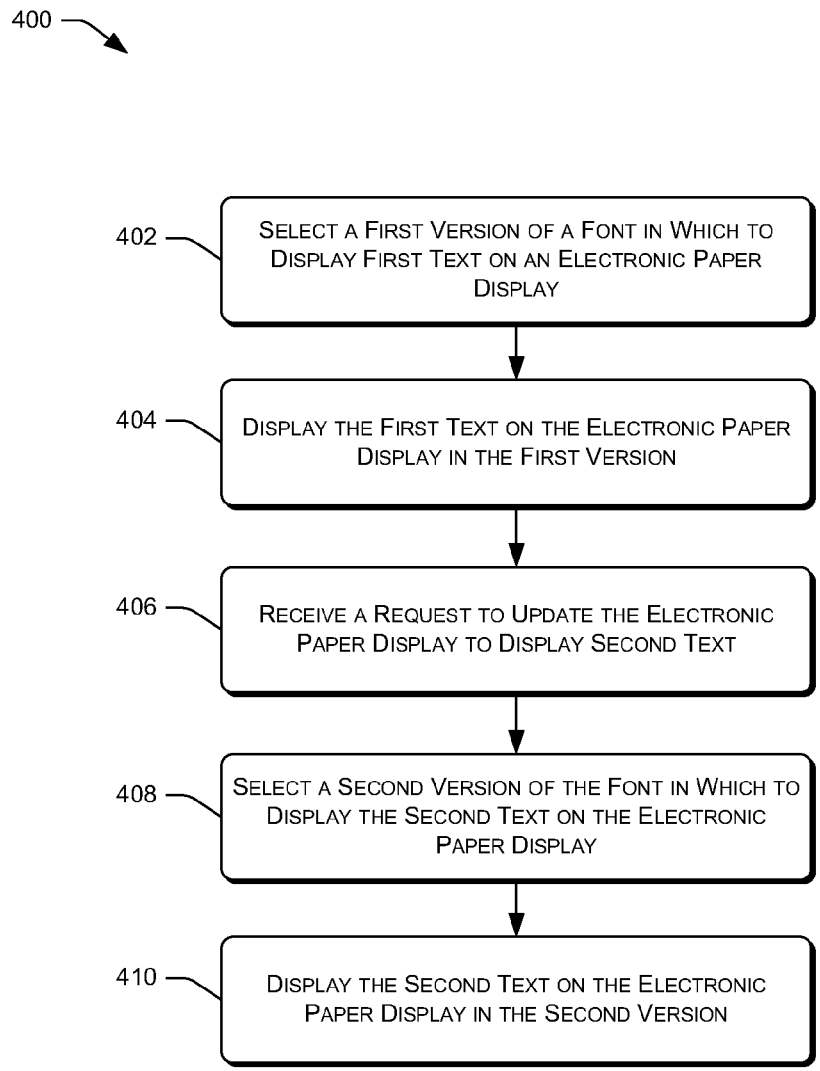
FIG. 4 illustrates an example process for selecting a version of a font in which to display first text of a content item and selecting a different version of the font in which to display second text of the content item.

FIG. 4 illustrates an example process 400 for selecting a version of a font in which to render first text of a content item and selecting a different version of the font in which to render second text of the content item. At 402, the process 400 selects a first version of a font in which to display text on an electronic paper display. At 404, the process 400 displays the first text on the electronic paper using the first version of the font. At 406, the process 400 receives a request to update the electronic paper display to display second text and, at 408, selects a second version of the font in which to display the second text. Both first and/or second text may be selected using font definition files or in real-time using an algorithm that takes one or more criteria into account. Finally, at 410, the process 400 displays the second text in the second version of the font.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. An electronic device comprising:
   an electronic paper display configured to display an electronic book;
   a display controller configured to update the electronic paper display;
   one or more processors; and
   one or more computer-readable media storing computer-executable instructions that, when executed on the one or more processors, cause the one or more processors to perform acts comprising:
   instructing the display controller to cause display of a first page of the electronic book using a first weight of a particular font;
   receiving a request to navigate from the first page of the electronic book to a second page of the electronic book; and
   at least partly in response to receiving the request, instructing the display controller to cause display of the second page of the electronic book using a second, different weight of the particular font.

2. An electronic device as recited in claim 1, the acts further comprising:
   causing display of the first page using a flashing waveform; and
   causing display of the second page using a non-flashing waveform; and
   and wherein the first weight of the particular font is greater than the second weight of the particular font.

3. An electronic device as recited in claim 1, the acts further comprising determining that the first page is to be displayed using a flashing waveform, and wherein the instructing the display controller to cause display of the first page using the first version further comprises instructing the display controller to cause display of the first page using the flashing waveform.

4. An electronic device as recited in claim 1, the acts further comprising determining that the second page is to be displayed using a non-flashing waveform, and wherein the instructing the display controller to cause display of the second page using the second version further comprises instructing the display controller to cause display of the second page using the non-flashing waveform.

5. An electronic device comprising:
   a display;
   one or more processors; and
   one or more computer-readable media storing computer-executable instructions that, when executed on the one or more processors, cause the one or more processors to perform acts comprising:
   causing, using a waveform display of text of a first portion of a content item using a first version of a font;
   receiving a request to display a second portion of the content item; and
   at least partly in response to receiving the request, causing, u waveform that updates less than an entirety of the display, display of text of the second portion in a second version of the font, the second version of the font being different than the first version of the font.

6. An electronic device as recited in claim 5, wherein:
   the first version of the font comprises the font in a first weight; and
   the second version of the font comprises the font in a second weight.

7. An electronic device as recited in claim 6, further comprising memory storing: (i) a first font definition file comprising the font in the first weight, and (ii) a second font definition file comprising the font in the second weight.

8. An electronic device as recited in claim 5, wherein at least one glyph of the first version of the font has an outline that differs from a corresponding glyph of the second version of the font.

9. An electronic device as recited in claim 5, wherein:
   the display comprises an electronic paper display;
   the waveform that updates the entirety of the display comprises a flashing waveform; and
   the waveform that updates less than the entirety of the display comprises a non-flashing waveform.

10. An electronic device as recited in claim 5, wherein the first version of the font includes a glyph having an outline that differs from a corresponding glyph of the second version of the font.

11. An electronic device as recited in claim 5, wherein the display comprises an electronic paper display.

12. A method comprising:
    under control of an electronic device that includes a display and that is configured with executable instructions,
    selecting a first version of a font in which to display a first page of a text on the display;
    displaying the first page on the display in the first version of the font;
    receiving a request to update the display to display a second page of the text;
    based at least in part on receiving the request, selecting a second version of the font in which to display the second page on the display; and
    displaying the second page on the display in the second version of the font.

13. A method as recited in claim 12, wherein:
    the first version of the font comprises the font in a first weight;
    the second version of the font comprises the font in a second weight, the second weight being different that the first weight; and
    the first and second weights are calculated using an algorithm that is based on one or more criteria.

14. A method as recited in claim 13, wherein the one or more criteria comprise a type of update that the electronic device will use when updating the display.

15. A method as recited in claim 13, wherein the one or more criteria comprise whether the electronic device will use a flashing waveform or a non-flashing waveform when updating the display.

16. A method as recited in claim 13, wherein the one or more criteria comprise an ambient temperature of the electronic device.

17. A method as recited in claim 13, wherein:
the display is associated with one of multiple batches of displays; and
the one or more criteria comprise which batch of the multiple batches the display is associated with.

18. A method as recited in claim 12, wherein:
the displaying of the first page comprises displaying the first page from a first font definition file stored in memory of the electronic device; and
the displaying of the second page comprises displaying the second page from a second font definition file stored in the memory of the electronic device.

19. A method as recited in claim 12, wherein:
the text includes an electronic book;
the displaying of the first page comprises displaying a page of the electronic book;
and
the displaying of the second page comprises displaying another page of the electronic book.

20. A method comprising:
under control of an electronic device that includes a display and that is configured with executable instructions,
selecting a first version of a font in which to display first text on the display, wherein the first version of the font comprises the font in a first weight;
displaying the first text on the display in the first version of the font;
receiving a request to update the display to display second text;
at least partly in response to receiving the request, selecting a second version of the font in which to display the second text on the display, wherein the second version of the font comprises the font in a second weight, the second weight being different that the first weight, and the first and second weights are calculated using an algorithm that is based on one or more criteria; and
displaying the second text on the display in the second version of the font.

21. A method as recited in claim 20, wherein the one or more criteria comprise a type of update that the electronic device will use when updating the display.

\* \* \* \* \*